(12) United States Patent
Ruijl et al.

(10) Patent No.: US 7,316,076 B2
(45) Date of Patent: Jan. 8, 2008

(54) COORDINATE MEASURING DEVICE AND A METHOD FOR MEASURING THE POSITION OF AN OBJECT

(75) Inventors: Theo Anjes Maria Ruijl, Eindhoven (NL); Jeroen Dekkers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 6 days.

(21) Appl. No.: 10/532,913

(22) PCT Filed: Sep. 22, 2003

(86) PCT No.: PCT/IB03/04247

§ 371 (c)(1),
(2), (4) Date: Apr. 27, 2005

(87) PCT Pub. No.: WO2004/040232

PCT Pub. Date: May 13, 2004

(65) Prior Publication Data

US 2006/0053648 A1  Mar. 16, 2006

(30) Foreign Application Priority Data

Oct. 29, 2002  (EP) .................................. 02079528

(51) Int. Cl.
  *G01B 5/00* (2006.01)
(52) U.S. Cl. .............................. 33/559; 33/556; 33/561
(58) Field of Classification Search .......... 33/559–561, 33/503, 556–558
See application file for complete search history.

(56) References Cited

U.S. PATENT DOCUMENTS

| 1,854,346 | A | | 4/1932 | Ostlind |
| 3,193,937 | A | | 7/1965 | Aller |
| 3,766,653 | A | | 10/1973 | McKay, Sr. |
| 4,333,238 | A | * | 6/1982 | McMurtry .................... 33/504 |
| 4,694,184 | A | | 9/1987 | Pryor |
| 5,103,572 | A | | 4/1992 | Ricklefs |
| 5,517,124 | A | * | 5/1996 | Rhoades et al. ............. 324/662 |
| 5,524,354 | A | * | 6/1996 | Bartzke et al. ................ 33/561 |
| 5,834,937 | A | * | 11/1998 | Burris ......................... 324/219 |
| 6,633,051 | B1 | * | 10/2003 | Holloway et al. ...... 250/559.29 |
| 6,708,420 | B1 | * | 3/2004 | Flanagan ...................... 33/556 |
| 2006/0070253 | A1 | * | 4/2006 | Ruijl et al. .................... 33/559 |

FOREIGN PATENT DOCUMENTS

| DE | 2019895 | 11/1971 |
| EP | 0415579 A1 | 3/1991 |
| GB | 2205650 A | 12/1988 |
| WO | WO0060310 | 10/2000 |

* cited by examiner

*Primary Examiner*—G. Bradley Bennett
*Assistant Examiner*—Tania C Courson

(57) ABSTRACT

A coordinate measuring device having a probe for contacting the object (15) to be measured. The probe comprises a sensing member (18) for contacting the object (15), a support unit (13), a supporting element (25) connecting said sensing member (18) to said support unit (13), a detection member (22), detection means (23) for detecting the position of said detection member (22). Said detection member (22) is carried by a connection element (26) and said connection element (26) is attached to said sensing member (18). The detection member may be shaped as pyramid having three reflective surfaces. The position of the detection member can be determined by using three fibers for illuminating the surfaces and three detector screens for capturing the reflected light.

13 Claims, 3 Drawing Sheets

COORDINATE MEASURING DEVICE AND A METHOD FOR MEASURING THE POSITION OF AN OBJECT

A coordinate measuring device and a method for measuring the position of an object The invention relates to a coordinate measuring device having a probe for contacting the object to be measured, the probe comprising (a) a sensing member for contacting the object, (b) a support unit, (c) a supporting element connecting said sensing member to said support unit, (d) a detection member, and (e) detection means for detecting the position of said detection member.

In general the sensing member for contacting the object has a spherical shape and is mounted at the end of the supporting element having the shape of a bar. The sensing member and the supporting element are often indicated as stylus, whereby the sensing member is the stylus tip. The supporting element is connected to the support unit, which unit may contain springs or other means to provide an elastic connection between said support unit and said supporting element.

A coordinate measuring device of this type is disclosed in GB-A-2205650. In it the supporting element is connected to the support unit by a leaf spring and the supporting element extends beyond the leaf spring, where a detection member is attached to the end of the supporting element. The position of the detection member related to the support unit is measured by detection means, the detection means being attached to the support unit. The position of the sensing member can be calculated after the position of the detection member and the position of the support unit are known.

Detection of the position of the detection member means that the location (three coordinates) of the detection member is measured, and, furthermore, that the orientation (three angles) of the detection member is measured. So, the position of the detection member is defined by six degrees of freedom.

The location (i.e. three coordinates) of a certain spot on the surface of an object can be measured by detecting the position of the detection member relative to the support unit when the sensing member is in contact with that spot, provided that the position of the support unit is known. However, because the sensing member is pushed against the surface of the object, a force will be exerted on the end of the supporting element and, therefore, the supporting element will bend and deform to a curved shape. Such bending of the supporting element during the measurement will result in a measurement uncertainty.

An object of the invention is to provide a coordinate measuring device by which the deformation of the supporting element (stylus) does not influence the result of the measurement.

In order to accomplish this objective, said detection member is carried by a connection element, and said connection element is attached to said sensing member. By connecting the detection member through a separate connection element to the sensing member, and not through the supporting element, there is always a predetermined relation between the position of the sensing member and the position of the detection member, independent of the forces exerted on the sensing member. Such forces may deform the shape of the supporting element, but such forces do not affect the shape of the connection element and, therefore, will not affect the relation between the position of the sensing member and the position of the detection member.

Preferably, said supporting element and said connection element are positioned substantially parallel with respect to each other. As a result, the sensing member is free to contact the object to be measured, except at the side where both elements, the supporting element and the connection element, are attached to the sensing member.

In one preferred embodiment, the length of said connection element is larger than the length of said supporting element. Therefore, the detection member at the end of the connection element can be located beyond the location where the supporting element is attached to the support unit, seen form the side of the sensing member. This will be further elucidated when an example of the device is described.

In one preferred embodiment, said supporting element substantially envelops said connection element. As a result, the cross-section of the supporting element may have a U-shape, but preferably the supporting element has a tube-like shape, so that the connection element completely surrounds the connection element.

In one preferred embodiment, said supporting element as well as the connection element includes a bend, so that the sensing member extends sidewardly. Such sidewardly directed sensing member can be used to measure the inside surface of a bore.

The invention also relates to a method of measuring the position of an object, the object being contacted by a sensing member of a probe, the probe comprising the sensing member, a supporting element carrying the sensing member and being attached to the support unit, in which the position of the sensing member is measured by detecting the position of a detection member which is connected to the sensing member through a connection element, separate from the supporting element.

The invention will be explained in more detail hereinafter by means of a description of some embodiments of a probe for a coordinate measuring device, in which reference is made to a drawing, in which.

The figures are merely schematic representations of an embodiment, in which less relevant parts are not shown.

Figure 1:
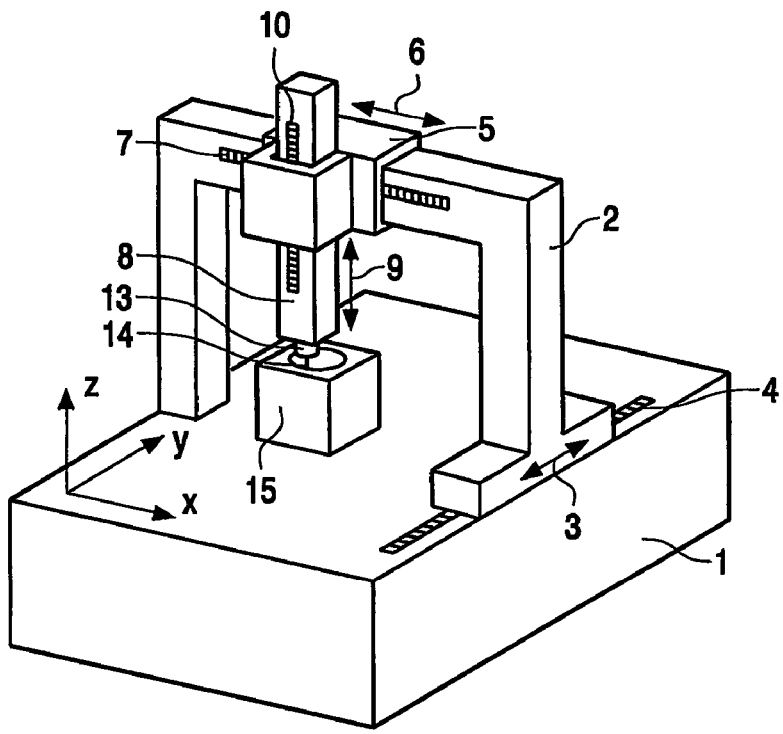
FIG. 1 is a perspective view of a coordinate measuring device.

FIG. 1 shows a coordinate measuring device having a base 1, for example made of granite. On the base 1 there is a first stage 2 which can move in one direction (Y-direction) with respect to the base 1, as indicated by arrow 3. The measuring scale 4 shows the linear position of the first stage 2 relative to the base 1.

A second stage 5 can move in one direction (X-direction) with respect to the first stage 2, as indicated by arrow 6. The measuring scale 7 shows the linear position of the second stage 5 relative to the first stage 2. And a third stage 8 can move in one direction (Z-direction) with respect to the second stage 5, as indicated by arrow 9. The measuring scale 10 shows the linear position of the third stage 8 relative to the second stage 5.

The lower end of the third stage 8 carries a probe, comprising a support unit 13, which is attached to the third stage 8, and a stylus 14 extending downwardly from the support unit 13. The stylus 14 is connected to the support unit 13 by elastic means, for example spring means, so that the stylus 14 can hinge with respect to the support unit 13.

By moving the first, the second and the third stages 2, 5, 8 with respect to each other and with respect to the base 1, the probe 13, 14 can be positioned at any predetermined location relative to the base 1. Such location can be indicated by three values measured on the three measuring scales 4, 7, 10.

An object 15 to be measured is placed on the base 1 of the coordinate measuring device, which is diagrammatically shown in FIG. 1. The geometry of the object 15 can be determined by measuring the exact location of certain spots on the outer surface of the object 15.

In order to perform such measurement the probe 13, 14 is moved by moving the stages 2, 5, 8 in such way that the tip of the stylus 14 (the sensing member) abuts against the relevant spot on the surface of the object 15. Then the location of the sensing member relative to the support unit 13 is determined, so that the position of the relevant spot on the surface of the object 15 can be calculated. By repeating such measurement at different spots on the surface of the object 15, the geometry of the object 15 can be determined.

Figure 2:
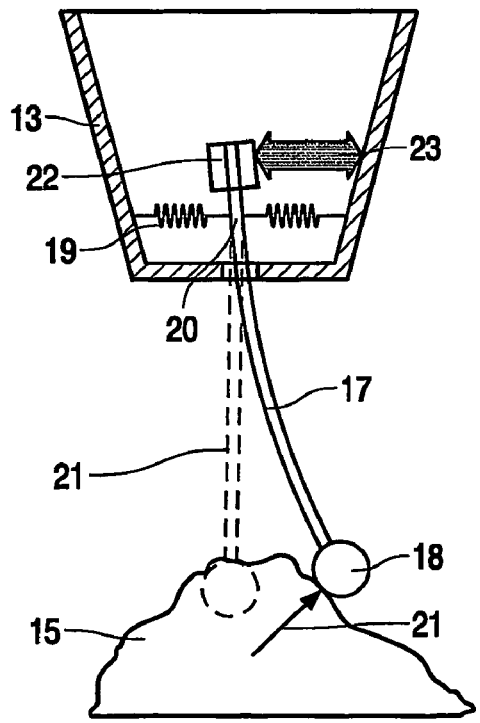
FIG. 2 shows a probe according to the state of the art.

FIG. 2 shows a probe according to the prior art. A support unit 13 supports a stylus comprising a supporting element 17 and a sensing member 18 attached to the lower end of the supporting element 17. The sensing member 18 is a sphere, preferably a sapphire sphere.

The stylus 17, 18 is suspended from the support unit 13 by spring means 19, so that the supporting element 17 can move with respect to the support unit 13. The supporting element 17 can only deviate from its original position if a force (arrow 21) is exerted on the sensing member 18, and therefore the supporting element 17 will deform (mainly bending). Such bending takes place when the sensing member 18 is abutting on the surface of an object 15 as shown in FIG. 2.

The degree of deformation of the supporting element 17, as shown in FIG. 2, is much more than in fact will happen during operation of the probe, but it makes clear that a portion of the supporting element 17 will deform. The original position 21 of the stylus 17, 18 is shown in dotted lines in FIG. 2.

Because the supporting element 17 moves relative to the support unit 13, a detection member 22, attached to the upper end of the supporting element 17 will move corresponding to the movement of the sensing member 18. The support unit 13 comprises detection means 23 for detecting the position of detection member 22 relative to the support unit 13. By measuring the position of detection member 22 the position of sensing member 18 can be calculated.

However, because of the bending of a portion of supporting element 17, the movement of the detection member 22 is not proportional to the movement of the sensing member 18. Although the degree of deformation (mainly bending) can be estimated and included in the calculation of the position of the sensing member 18, the deformation of the supporting element 17 is one of the main sources of measurement uncertainty when the position of the sensing member 18 is determined.

Figure 3:
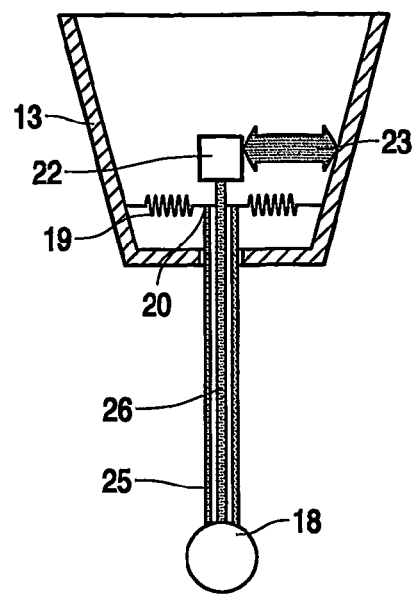
FIG. 3 shows an embodiment of a probe according to the invention.

FIG. 3 shows a probe corresponding to the probe of FIG. 2, however, the sensing member 18 is connected to the support unit 13 by a tube-like supporting element 25. This tube-like supporting element 25 is connected to the support unit 13 by spring means 19.

The detection member 22 is not attached to the supporting element 25, but it is carried by a connection element 26. The connection element 26 is attached to the sensing member 18 and extends inside the hollow supporting element 25 without touching the supporting element.

Because the sensing member 18 and the detection member 22 are interconnected by connection element 26, the connection element 26 and the detection member 22 not contacting any other part of the device, there will always be a predetermined relation between the position of the detection member 22 and the position of the sensing member 18.

Therefore, the position of the sensing member 18 can be calculated when the position of the detection member 22 is detected by the detection means 23, independent of any bending of the supporting element 25.

Figure 4:
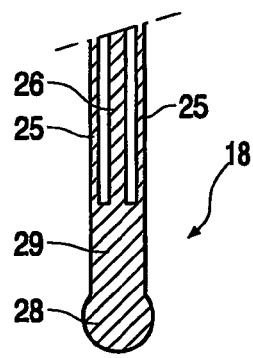
FIG. 4 shows a second embodiment.

FIG. 4 is a sectional view of a second embodiment of a probe where the sensing member 18 comprises not only the spherical portion 28, but also a bar-like portion 29. The tube-like supporting element 25 and the connection element 26 are both attached to the bar-like portion 29 of the sensing member 18.

Figure 5:
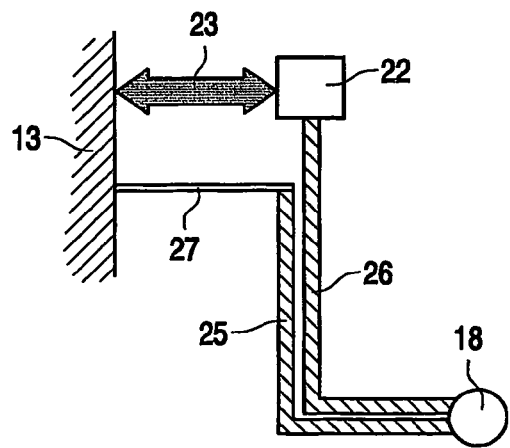
FIG. 5 shows a third embodiment.

FIG. 5 shows a third embodiment of a probe, where the supporting element 25 and the connection element 26 are positioned in parallel with each other. Supporting element 25 is connected to the support unit 13 through a spring-like element 27, for example a leaf spring. Both elements 25, 26 have a bend of for example 90 degrees, so that the sensing member 18 is positioned sidewardly. Such sidewardly directed sensing member 18 can be used to measure the inside surface of a sidewardly located bore.

Detection member 22 is attached to connection element 26 and its position with respect to the support unit 13 can be measured by detection means 23. After the position of the detection member 22 has been measured, the position of the sensing member 18 can be calculated, independent of any bending of supporting element 25.

Figure 6:
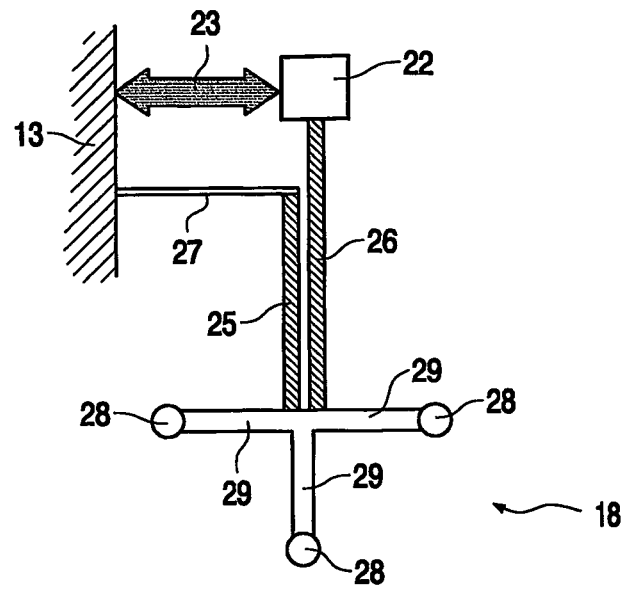
FIG. 6 shows a fourth embodiment.

FIG. 6 shows a fourth embodiment of a probe, where the sensing member is provided with more spherical portions 28, in this example three, which are interconnected by bar-like portions 29. Each of the spherical portions 28 can contact the object to be measured, depending on the direction the object is approached from.

Figure 7:
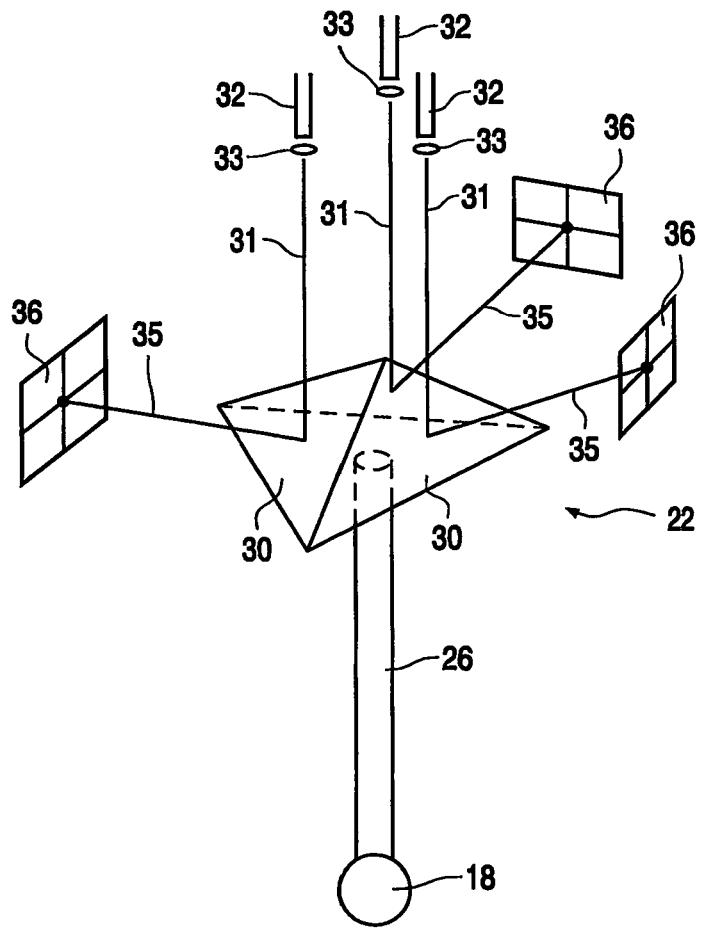
FIG. 7 shows the detection means.

FIG. 7 shows an embodiment of the detection means 23 of the probe. The connection element 26 carries at its lower end the sensing member 18 and at its upper end the detection member 22. As explained above, the position of the sensing member 18 can be calculated when the position of the detection member 22 is measured. The position of the detection member involves the location of the detection member 22 as well as its orientation.

The detection member 22 is shaped as a pyramid having three inclined triangular surfaces 30, being mirrors. From ahead three laser beams 31 are provided through three fibers 32 and three lens systems 33. Each of the three laser beams 31 is directed to one of the three triangular mirrors 30 of the detection member 22. The three laser beams 35 are reflected by the mirrors 30 and received by three detector screens 36. Each of the three detector screens 36 measures the location where the laser beam hits the screen.

All the components of the detections means 23: the fibers 32, the lens systems 33 and the detector screens 36, are fixed in the support unit 13. Therefore, the position of the detection member 22 can be calculated based on the data coming from the three detector screens 36, i.e. the locations where the laser beams 35 strike the detector screens 36.

With such a system the location and the orientation of the detection member 22 can be measured without introducing any mechanical contact between the detection member 22 and the support unit 13, so as to avoid any mechanical loading of the connection element 26.

After the position of the detection member 22 has been measured, the position of the sensing member 18 can be calculated, so that the relevant spot on the surface of the object 15 to be measured is determined.

The embodiment of the coordinate measuring device as described above is merely an example; a great many other embodiments are possible.

The invention claimed is:

1. A coordinate measuring device having a probe for contacting an object to be measured, the probe comprising:
   a sensing member for contacting the object;
   a support unit;
   a supporting element connecting said sensing member to said support unit;
   a detection member;
   detection means for detecting the position of said detection member;
   wherein said detection member is carried by a connection element, and in that said connection element is attached to said sensing member,
   wherein said supporting element and said connection element are positioned substantially adjacent to and parallel with each other without touching each other, and
   wherein said connection element is longer than said supporting element so that said supporting element does not contact said detection member.

2. The coordinate measuring device as claimed in claim 1, wherein said supporting element substantially envelops said connection element.

3. The coordinate measuring device as claimed in claim 2, wherein said supporting element is a hollow tube completely surrounding said connection element.

4. The coordinate measuring device as claimed in claim 1, wherein the supporting element as well as the connection element includes a bend.

5. The coordinate measuring device as claimed in claim 1, further comprising a spring connecting between said supporting element and said support unit.

6. The coordinate measuring device as claimed in claim 5, wherein said spring is a leaf spring.

7. The coordinate measuring device as claimed in claim 1, wherein said sensing member comprises a spherical portion and a bar-like portion, said supporting element and said connection element being connected to said bar-like portion.

8. The coordinate measuring device as claimed in claim 1, wherein said sensing member comprises a plurality of spherical portions and a plurality of bar-like portions, each one of said spherical portions being connected to one of the said plurality of bar-like portions.

9. The coordinate measuring device as claimed in claim 1, wherein said detection member comprises a pyramid having an inclined triangular surface, and said detection means comprises a laser beam and a detector screen, wherein said laser beam is directed to said inclined triangular surface to generate a reflected laser beam incident on said detector screen.

10. A method of measuring the position of an object, the object being measured is contacted by a sensing member of a probe, the probe comprising the sensing member, a supporting element carrying the sensing member and being attached to a support unit, in which the location of the sensing member is measured by detecting the position of a detection member which is connected to the sensing member through a connection element, wherein said supporting element and said connection element are positioned substantially adjacent to and parallel with each other without touching each other, wherein said connection element is longer than said supporting element so that said supporting element does not contact said detection member.

11. A coordinate measuring device having a probe for contacting an object to be measured, the probe comprising:
   a support unit;
   a sensing member,
   a spring connected to said support unit;
   a detection member;
   a detection means for detecting position of said detection member;
   a supporting element having a first support end and a second support end, said first support end being connected to said spring and said second support end being connected to said sensing member;
   a connection element having a first connect end and a second connect end, said first connect end being connected to said detection member and said second connect end being connected to said sensing member;
   wherein said supporting element and said connection element are substantially adjacent to and parallel with each other without touching each other, wherein said connection element is longer than said supporting element so that said supporting element does not contact said detection member.

12. The coordinate measuring device as claimed in claim 11, wherein said supporting element is a tube having a hollow center, said connection element being disposed in said hollow center.

13. The coordinate measuring device as claimed in claim 12, wherein said supporting element includes a 90 degree bend.

* * * * *